(12) United States Patent
Laporte et al.

(10) Patent No.: US 10,623,803 B2
(45) Date of Patent: Apr. 14, 2020

(54) ESSENCE CONTENT CREATION, MODIFICATION AND/OR DELIVERY METHODS AND SYSTEMS

(71) Applicants: Patrick Laporte, Morgan Hill, CA (US); Kelvin R Franklin, Fremont, CA (US)

(72) Inventors: Patrick Laporte, Morgan Hill, CA (US); Kelvin R Franklin, Fremont, CA (US)

( * ) Notice: Subject to any disclaimer, the term of this patent is extended or adjusted under 35 U.S.C. 154(b) by 0 days.

(21) Appl. No.: 15/261,849

(22) Filed: Sep. 9, 2016

(65) Prior Publication Data

US 2019/0149875 A1 May 16, 2019

Related U.S. Application Data

(60) Provisional application No. 62/216,231, filed on Sep. 9, 2015.

(51) Int. Cl.
| | |
|---|---|
| *H04N 7/10* | (2006.01) |
| *H04N 7/025* | (2006.01) |
| *H04N 21/431* | (2011.01) |
| *G06K 9/00* | (2006.01) |
| *H04N 21/488* | (2011.01) |
| *G06F 16/483* | (2019.01) |
| *H04N 21/854* | (2011.01) |
| *H04N 21/231* | (2011.01) |
| *G11B 27/10* | (2006.01) |

(52) U.S. Cl.
CPC ....... *H04N 21/4316* (2013.01); *G06F 16/483* (2019.01); *G06K 9/00671* (2013.01); *G11B 27/10* (2013.01); *H04N 21/23109* (2013.01); *H04N 21/488* (2013.01); *H04N 21/854* (2013.01)

(58) Field of Classification Search
CPC .................... H04N 21/2743; H04N 21/278
See application file for complete search history.

(56) References Cited

U.S. PATENT DOCUMENTS

| | | | |
|---|---|---|---|
| 2008/0109482 A1* | 5/2008 | Macchletti | ............. G06F 16/21 |
| 2011/0004826 A1* | 1/2011 | Cho | ....................... H04H 20/26 |
| | | | 715/716 |

(Continued)

*Primary Examiner* — Gigi L Dubasky

(57) ABSTRACT

A method includes the step of A method includes receiving an essence from a source device. The essence comprises one or more elements of media content used in a live-production broadcast environment. The essence is used by a broadcast director to apply artistic intent for distribution to viewers of a broadcast. The method includes creating an essence catalog. The essence catalog uses unique identifiers generated by the source device to associate an essence metadata and an essence content with a source device, a captured event, a date for future recall ability. The method includes implementing an essence store, wherein the essence store describes how an essence is stored in a data store. The method includes storing the essence in the essence store. The method includes implementing an essence recall that describes how an essence is to be searched for and recalled for use by a director of the broadcast. The method includes implementing an essence search based on the essence recall. The method includes obtaining the stored essence.

8 Claims, 19 Drawing Sheets

(56) References Cited

U.S. PATENT DOCUMENTS

2012/0144302 A1* 6/2012 Campanotti ... H04N 21/234309
  715/716
2015/0016661 A1* 1/2015 Lord ............... H04N 21/42203
  382/100

* cited by examiner

| DEVICE | RAW CONTENT | METADATA |
|---|---|---|
| VIDEO CAMERA | CAPTURED VIDEO SIGNAL | CAMERA IP ADDRESS, MANUFACTURER, MODEL, GPS LOCATION, DATE, TIME, CAMERA ID, CAMERA SETTINGS, OPERATOR ID, ESSENCE TYPE (E.G. VIDEO), PLATFORM TYPE (E.G. MOBILE, STATIC), ETC. |
| MICROPHONE | CAPTURED AUDIO SIGNAL | MIC IP ADDRESS, MANUFACTURER, MODEL, GPS LOCATION, DATE, TIME, MIC ID, MIC SETTINGS, OPERATOR ID, PLATFORM TYPE (E.G. MOBILE, STATIC), ESSENCE TYPE (E.G. AUDIO), ETC. |
| WEARABLE DEVICE | CAPTURED DATA (STEPS, HITS, HEART RATE, BODY TEMP, GPS LOCATION, ETC.) | DEVICE IP ADDRESS, MANUFACTURER, MODEL, DATE, TIME, DEVICE ID, DEVICE SETTINGS, WEARER ID, ESSENCE TYPE (E.G. BIO METRIC), ETC. |
| NETWORK SWITCH | NONE | DEVICE IP ADDRESS, MANUFACTURE, MODEL, DATE, TIME, OS VERSION, PORT USAGE, FLOW ID USAGE, ROUTE ID USAGE, ETC. |
| AUDIENCE DEVICE (E.G. MOBILE PHONE) | CAPTURED VIDEO AND AUDIO | DEVICE TYPE, MANUFACTURER, MODEL, DATE TIME, OS VERSION, OPERATOR ID (E.G. FAN) |
| DRONE PLATFORM | NONE | DEVICE MANUFACTURER, MODEL, DATE, TIME, ETC. |

| ESSENCE SOURCE | CATALOG INFORMATION |
|---|---|
| VIDEO | - ESSENCE TYPE: VIDEO<br>- UNIQUE CAMERA ID: BASED OFF CAMERA MAC ADDRESS<br>- CAMERA MANUFACTURER, MODEL, OS, ETC.<br>- CAMERA IP ADDRESS<br>- CAMERA NUMBER: ASSIGNED BY BROADCAST ENGINEERS DURING EVENT SETUP<br>- CAMERA SETTINGS<br>- CAMERA OUTPUT STORAGE ID: UNIQUE IDENTIFIER CREATED USING ANY COMMON METHOD FOR GENERATING A UNIQUE ID AND USED TO CONNECT EACH VIDEO ESSENCE WITH THE LOCATION OF ITS RAW CONTENT.<br>- DATE IN USE<br>- TIME IN USE<br>- GPS LOCATION (IF AVAILABLE)<br>- EVENT NOTES TO BE ENTERED BY BROADCAST ENGINEERS DURING EVENT SETUP |

| | |
|---|---|
| NETWORK | • ESSENCE TYPE: NETWORK<br>• UNIQUE SWITCH ID: BASED OFF DEVICE UNIQUE ID SUCH AS MGMT. PORT IP OR MAC ADDRESS<br>• NETWORK DEVICE TYPE: WIRED, WIRELESS AP<br>• SWITCH MANUFACTURER, MODEL, OS, ETC.<br>• SWITCH SETTINGS<br>• SWITCH MGMT. PORT IP ADDRESS<br>• SWITCH PORT INFORMATION: FLOWS IN USE AND BY WHICH PORTS<br>• SWITCH PEERS: IP ADDRESSES OF SWITCHES CONNECTED<br>• SWITCH NUMBER: ASSIGNED BY BROADCAST ENGINEERS DURING EVENT SETUP<br>• SWITCH HEALTH: CAPTURE STATUS OF CRITICAL COMPONENTS SUCH AS: FAN, POWER, INTERNAL TEMPERATURE, CPU UTILIZATION, MEMORY UTILIZATION, AVAILABLE STORAGE, PORTS IN USE, TOTAL NUMBER OF PORTS, ETC. AT TIME OF USE<br>• DATE IN USE<br>• TIME IN USE<br>• GPS LOCATION (IF AVAILABLE)<br>• EVENT NOTES TO BE ENTERED BY BROADCAST ENGINEERS DURING EVENT SETUP |

| NETWORK | • ESSENCE TYPE: FLOW |
| --- | --- |
| | • FLOW NAME: AS DEFINED BY NETWORK ENGINEER OR BROADCAST ENGINEER |
| | • UNIQUE FLOW ID: BASED OFF UNIQUE ID GENERATED BY FLOWID GENERATOR METHOD. |
| | • SWITCHES IN USE: LIST OF SWITCH IDS THROUGH WHICH THIS FLOW APPLIES |
| | • ENCRYPTION ON/OFF |
| | • ENCRYPTION TYPE |
| | • ENCODING ON/OFF |
| | • QOS SETTINGS |
| | • BANDWIDTH CAPACITY: END TO END BANDWIDTH AVAILABLE |
| | • DATE IN USE |
| | • TIME IN USE |
| | • FLOW NOTES TO BE ENTERED BY BROADCAST ENGINEERS DURING EVENT SETUP |

| NETWORK | • ESSENCE TYPE: ROUTE |
| --- | --- |
| | • ROUTE NAME: AS DEFINED BY NETWORK ENGINEER OR BROADCAST ENGINEER |
| | • UNIQUE ROUTE ID: BASED OFF UNIQUE ID GENERATED BY ROUTEID GENERATOR METHOD. |
| | • SWITCHES IN USE: LIST OF SWITCH IDS THROUGH WHICH THIS ROUTE APPLIES |
| | • ENCRYPTION ON/OFF |
| | • ENCRYPTION TYPE |
| | • BANDWIDTH CAPACITY: END TO END BANDWIDTH AVAILABLE |
| | • DATE IN USE |
| | • TIME IN USE |
| | • ROUTE NOTES TO BE ENTERED BY BROADCAST ENGINEERS DURING EVENT SETUP |

ESSENCE CONTENT CREATION, MODIFICATION AND/OR DELIVERY METHODS AND SYSTEMS

CROSS-REFERENCE TO RELATED APPLICATIONS

This application is a claims priority to U.S. provisional patent application No. 62/216,231, titled ESSENCE CONTENT CREATION, MODIFICATION AND/OR DELIVERY METHODS AND SYSTEMS and filed on 9 Sep. 2015. This provisional application is hereby incorporated by reference in its entirety.

BACKGROUND

1. Field

This application relates generally to the media broadcasting, and more particularly to a system, method and article of manufacture of essence content creation, modification and/or delivery methods and systems.

2. Related Art

Various unsolved challenges and subsequent unique solutions remain to reliably deliver constraint-based content such as live production content; where latency, bandwidth, encryption and more challenges from using IP-based systems must be addressed. The overarching use case for encapsulating all known methods is called a Broadcast Foundry. Like any other Foundry, raw materials enter one side and are processed into finish goods before coming out the other side and distributed to customers and viewers. Unfortunately, with so much information available and so much potential to enhance the viewing experience, there needs to be a way to capture, catalog, store, and call upon each and every essence without impeding artistic intent. Accordingly, new improvements can be implemented to receive, catalog, store, and re-assemble raw materials based on artistic intent for recording and/or distribution to a viewing audience.

BRIEF SUMMARY OF THE INVENTION

A method includes the step of A method includes receiving an essence from a source device. The essence comprises one or more elements of media content used in a live-production broadcast environment. The essence is used by a broadcast director to apply artistic intent for distribution to viewers of a broadcast. The method includes creating an essence catalog. The essence catalog uses unique identifiers generated by the source device to associate an essence metadata and an essence content with a source device, a captured event, a date for future recall ability. The method includes implementing an essence store, wherein the essence store describes how an essence is stored in a data store. The method includes storing the essence in the essence store. The method includes implementing an essence recall that describes how an essence is to be searched for and recalled for use by a director of the broadcast. The method includes implementing an essence search based on the essence recall. The method includes obtaining the stored essence.

BRIEF DESCRIPTION OF THE DRAWINGS

FIG. 6 illustrates an example table illustrating various example source devices, associated raw content and/or metadata, according to some embodiments.

Figure 1:
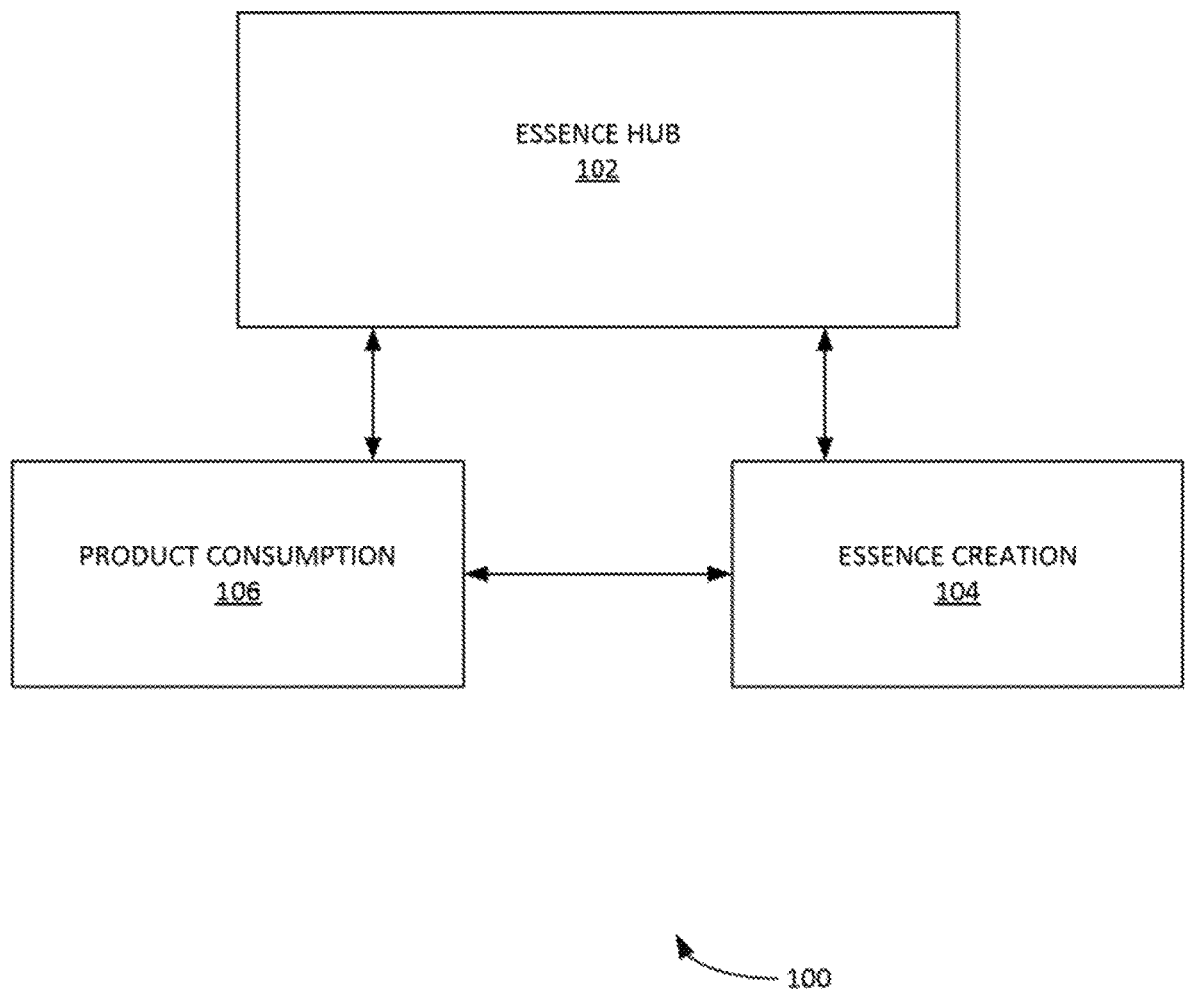
FIG. 1 illustrates an example system of modules for essence content creation, modification and/or delivery, according to some embodiments.

The Figures described above are a representative set, and are not an exhaustive set with respect to embodying the invention.

DESCRIPTION

Disclosed are a system, method, and article of essence content creation, modification and/or delivery methods and systems. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote servers and/or software networks can be a collection of remote computing services.

Content can include data comprised of audio, video, and/or other metadata that is captured, transmitted, organized, stored, and/or viewed for entertainment, informational, and/or educational purposes.

Constraint-based content can include content found in, but not limited to, live production broadcasts. Constraint-based content can be delivered from source to destination with precise timing and of sufficient quality while addressing IP-based infrastructure challenges such as, inter alia, latency, encryption, bandwidth, physical distance, etc.

Essence can be raw video, audio, text-based or post-production quality, as well as meta-data about said media. In some examples, an essence can include elements of content such as that found in live production broadcast environments and used by broadcast directors to apply artistic intent for distribution to viewers. Elements of information technology (IT) infrastructure can include a network switch, a switch port, a data flow, or a data traffic route, assembled to provide a service to a business or organization.

Network switch can be a computer networking device that connects devices together on a computer network by using packet switching to receive, process and forward data to the destination device.

Exemplary Systems

In the Broadcast Foundry, raw materials are content such as video, audio, metadata; live or pre-recorded. All content and elements used to transmit that content and metadata is made of foundational elements referred to as essences. The Broadcast Foundry is where the raw materials are sent and stored so any "Director" can organize these essences into production content that can be recorded for future playback or distributed directly to consumers for viewing.

For every event or performance that is captured for live or future viewing, there are an infinite number of essences beyond just video and audio surrounding that event that could be captured. But today's Serial Digital Interface (SDI)-based technology limits the number of these essences from being collected which in turn, limits the amount of essences from which the Director can draw from resulting in a limited overall experience for the viewer. However, with the transition to Internet Protocol (IP)-based technology for broadcast signal transmission, the explosion of Internet of Things (IoT) and the continued miniaturization and advanced capabilities of technology (wearable and fixed); an unprecedented opportunity for Directors is emerging. With access to an infinite number and type of essences at their disposal, Directors have an opportunity to provide a more comprehensive and immersive viewing experience.

Various examples of use are now discussed.

Live Broadcast Sporting Events: In addition to video, audio, statistics, and animation essences; the following could also be made available:

Biometric information from each player shows their body temperature, their oxygen saturation, g-force information, speed, heart rate, etc.

GPS information to show their position relative to the field of play, the distance traveled per play, per game, position relative to other elements such as opposing players or the game ball Fan-based information to show feeds and audio from fans, information collected from fan devices, etc.

Live Police/Military activity: In addition to live audio and recorded video; the following could also be made available:

Biometric information from each officer or soldier shows their body temperature, their oxygen saturation, g-force information, speed, heart rate, etc.

GPS information to show their position relative to the field of engagement, building, etc. which can then be overlaid on a topographical map or architectural drawing to assist commanders with coordination. Additional elements can be the distance traveled per period of time, per engagement, position relative to other elements, etc.

Augmented pre-recording: In addition to traditional playback, a director could pull from live and/or previously recorded elements to augment and enhance the experience. For example, replaying a live event could be augmented by showing statistics at defining moments and relevant to the outcome of the game.

FIG. 1 illustrates an example system 100 of modules for essence content creation, modification and/or delivery, according to some embodiments. Essence hub module 102 includes components that, inter alia: receive essences, catalog essences, store essences (e.g. in a database), process essences using artistic intent, distribute essences to viewers of digital media such as two-dimensional (2D), three-dimensional (2D), virtual reality, or animation via various user-side computing devices (e.g. smart phones, tablet computers, personal computers, laptop computers, wearable computers such as head-mounted displays, digital media players, video game consoles, etc.). Essence Creation module 104 method includes components used for the creation of essences and post-production products to be created. Product Consumption module 106 can include components used for accessing and viewing various essences and/or essence-related product(s).

Figure 2:
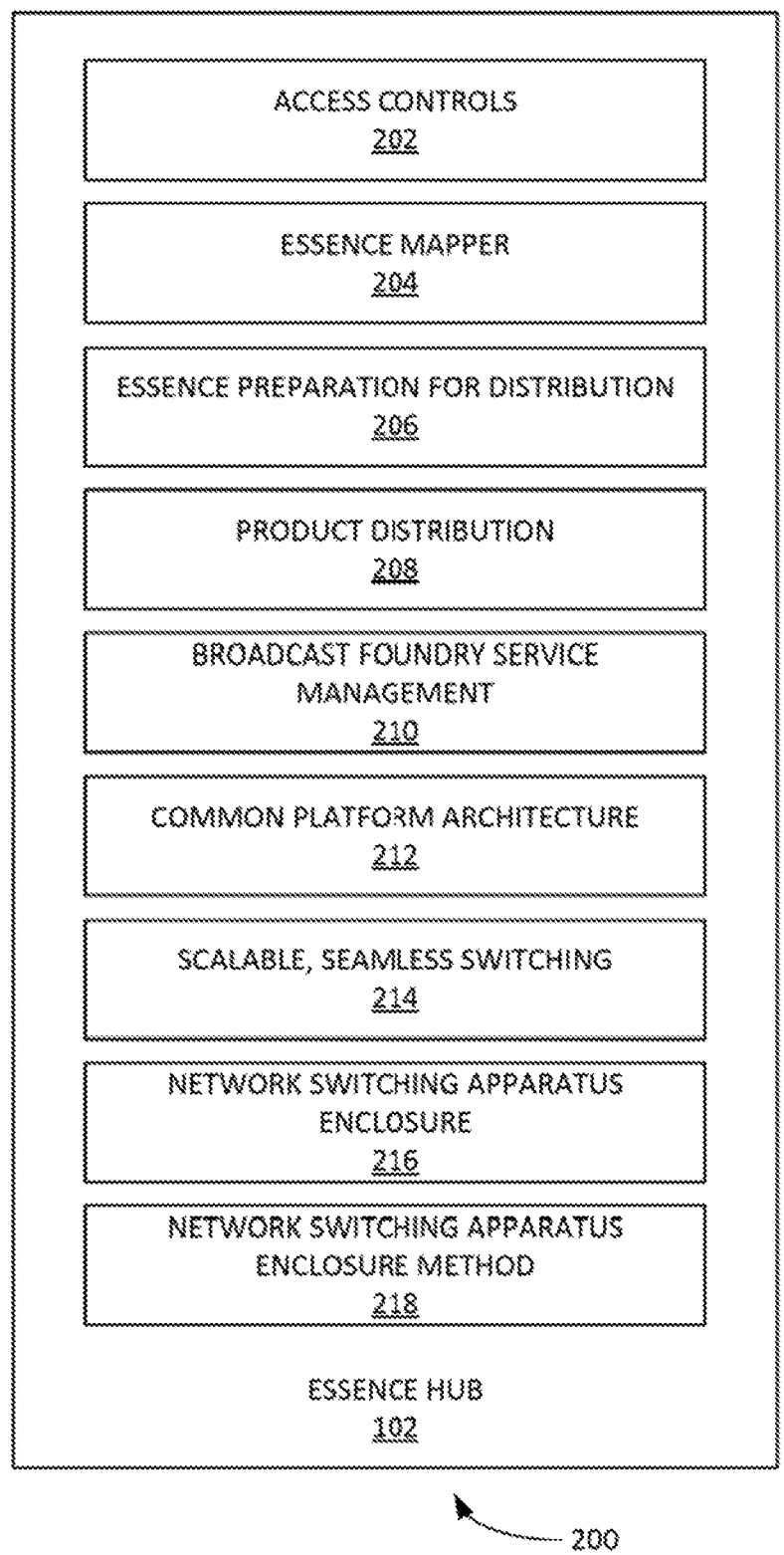
FIG. 2 illustrates an example implementation of an essence hub module, according to some embodiments.

FIG. 2 illustrates an example implementation of an essence hub module 102, according to some embodiments. Essence hub module 102 can provide various components required for essence content to be received, cataloged, transcoded, stored, processed, and/or distributed to viewers (e.g. as used herein a viewer can be any user that reads, watches, listens to essence content and/or metadata related to essence content).

Essence mapper 204 can implement the receipt, cataloging, encoding and/or storage of essence content in various ways. Essence mapper 204 can capture, record, and/or map various independent essences such that a director can view, select, and/or combine said essences based on his/her artistic intent.

An example of the use of 'live' (e.g. production broadcast in real-time, as events happen, in the present) essences is now discussed. Various sources of essence audio, video, and/or metadata (e.g. text-based input devices and/or services, whether remote and/or from broadcast studio, etc.) can be securely connected to essence hub 102 using a provided computer address (e.g. a specified internet protocol (IP) address, a universal resource locator (URL) for live broadcast content, etc.). Closed captioning can be an example of metadata. Examples of Text-based content streaming services are stock ticker, news and/or weather streaming services, Twitter® or other microblog feeds, etc.

As essence content is received at essence hub 102, the following process can be implemented on the essence content. Independent essences can be extracted using services embedded in an essence-aware Common Platform Architecture (CPA)-based hardware and software. Each individual essence can be extracted, mapped, stored, and in the event of live production. This can then be forwarded to the Director for combining with other essences and/or content such that artistic intent can be applied in preparation for publishing (e.g. using a broadcasting workflows to publish a final product). The essence content can be encoded using commonly-used encoding formats and/or streamed to storage for future access. Independent essences can be extracted where possible using services embedded in essence-aware CPA hardware and software. Essences can be cataloged. Essences can be streamed to a Director interface for live production distribution.

In the case of a pre-recorded or post-production product(s) the following process can be implemented. Essence content can be encoded and/or transcoded at the source into generally accepted formats (e.g. as an MPEG). Essence content can be uploaded to essence hub 102 in a secure manner using a specified-computer address such as an IP address and/or universal resource locator (URL) interface. Essence content can be cataloged. Essence content can be stored based on a contributor's account settings.

Essence preparation for distribution module 306 can prepare essence content prep for distribution (e.g. as a broadcast Foundry product). Essence preparation for distribution module 306 can implement the following process. An interface and/or interfaces to enable artistic intent and running on user devices such as desktop computers or custom-built production equipment physically located anywhere there is Internet connectivity to Broadcast Foundry. The currently accessible essences can be viewed using common industry formats and protocols (e.g. video formats and protocols, formats and protocols, metadata, text-based streaming data (e.g. news or weather streams), computer-generated content including 3D or virtual reality, etc.). A next step can include viewing of and access to pre-recorded/post-production content library. Audio devices can be provided for voice over. An interface for turning closed captioning broadcast on/off can be provided. A view of subscriber-accessible essence content (e.g. an amateur director view) can be provided. AV Controller-type device or application with an interface for overlaying/combining essence content (e.g. Video, Audio, text-based, metadata, etc.) can be provided into a post-production product for viewing. An interface and/or mechanism for switching between audio/video feeds can also be provided.

Essence cataloging can include cataloging, inter alia: a contributor account ID, a Broadcast Foundry-generated file name, a contributor-specified file name, a file index, a contributor-specified directory location, a relevant storage media (e.g. Flash, spinning disk, etc.). Cataloging can be based on criteria such as: type of content; playback performance required; date/time of upload; etc. For each time content that is accessed, an access log entry can be created showing, for example: data/time of access; location in file where content accessed (e.g. a point where viewing began); duration of access (e.g. how much has been viewed); type of content such as video, audio, computer-generated 3D or virtual reality essence data, etc.; content format (e.g. HD, SD, UHD, MPEG, etc.); product distribution module 208 can manage distribution of post-production content (e.g. a 'product'); etc. This process can enable a product to be available to viewers whereby content is 'published' to a location for viewing. Accordingly, viewers can connect and subscribe to a desired specified 'channel'. Method streams can publish a product to subscribers' devices based on account access criteria.

Access controls module 202 can enable users to various levels of access control in system 100. A user can be provided an access profile. Various example access profiles are now provided. A Broadcast Foundry Service Management profile can enable a user to maintain and manage system 100. An essence-content contributor profile enables a user to upload live audio/video feeds and post-production content for use by Directors and Broadcasters. A post-production content subscriber profile enables a user to subscribe to the various 'channels' provided by system 100 (e.g. a channel can provide various media content). A subscription package level can control which content the user can view. An amateur director profile can enable a user to access to non-exclusive content. A professional-broadcaster level profile can enable a user to have access to more and exclusive content (such as professional sporting event feeds) as well and ability to better manipulate content. The professional-broadcaster level profile can enable a user to control which users have access to their content. The professional-broadcaster level profile can enable a user to combine content. The professional-broadcaster level profile can enable a user to switch between multiple live feeds. The professional-broadcaster level profile can enable a user to add voice over content.

A broadcast-foundry service management module can be used to control and management of system 100. The broadcast-foundry service management module can control who is a broadcaster, amateur Director and/or a Subscriber. The broadcast-foundry service management module can store contact information. The broadcast-foundry service management module can track usage (e.g. content contribution and distribution). The broadcast-foundry service management module can provide monitoring and service usage for service users. The broadcast-foundry service management module can provide billing services.

System 100 can use Common Platform Architecture (CPA) module 212 to ensure that system 100 continuously delivers services. CPA module 212 can manage the various switches and servers running a common core operating system (OS). With a common OS, the compute and networking infrastructure can be clustered as one single unit.

Accordingly, if a server suffers hardware failure, workloads can be transferred to remaining servers. If a process on a switch or server fails, the process can be restarted.

A post-production product capture process is now provided. This process can enable users to upload post-production products to system 100. Recorded video/audio content can be captured using any recording device and stored in widely accepted video file formats. When supported, recording device can capture and stores metadata in compatible file format. Recorded audio content can be captured using a recording device and stored in a specified video file format. Computer-generated content (e.g. graphics and/or animation) can be created and stored in commonly used file formats. A user can access system 100 with appropriate credentials uploads post-production product(s) to essence hub. 102 as provided herein.

Scalable Seamless Essence Switching module 214 can manage seamless essence switching. Essence sources (such as audio, video, metadata, text, etc.) can be received by one or more ports of a switching apparatus. Each essence can be time-stamped by the source device, a network gateway device (e.g. SFP) and/or the Switching Apparatus to ensure accurate switching. An interface, such as a Director's control panel, can initiate a request to change from source one (1) to source two (2) (e.g. video sources). The control panel can communicate a message to network controller (e.g. running on a switching apparatus and/or some other centralized location) to switch video feed from the switch and port providing video source one (1) to switch and port providing video source two (2). The controller can then communicate a message to appropriate switches to update flow tables. Each switch can update flow tables at appropriate time using, inter alia: the video blanking frame provided from video source one (1) media gateway; the video blanking frame provided from the video source two (2) media gateway, etc. From that point forward, video source two (2) content can be sent to a target audience. Video source one (1) content can be either discarded upon arrival or sent to storage for capture.

In the example of a large-scale broadcast factories (e.g. where there are more essence sources and product destinations than can be provided by a single network switching apparatus) multiple controllers may be employed. In one example, a controller master can serve as a centralized point of control and handle inter-switch requests. The master controller can communicate switching request to 'slave' controllers located within each switching apparatus. A slave controller can perform the switch using scalable seamless essence switching module 214 in coordination with the master controller and other slave controllers as needed.

Network Switching Apparatus Enclosure 216 can include the primary components required for a broadcast plant switch enclosure (e.g. see Appendix B of U.S. Provisional Patent Application No. 62/216,231 incorporated herein by reference). Network Switching Apparatus Enclosure Method module 218 can interact with the Network Switching Apparatus for broadcast plant-specific functions and services (e.g. see Appendix B of 62/216,231 U.S. Provisional Patent Application No.).

Essence hub 102 can include additional modules, systems, processes, etc., not shown (e.g. search engines, web servers, digital image/video editors, audio file editors, database managers, etc.). For example, essence hub 102 can provide plug-n-play scalability using device auto-detection and auto-configuration services such that broadcasting engineers can add/remove capacity within the Common Platform Architecture (CPA) by just plugging or un-plugging components together and providing power to the device.

Essence hub 102 can ensure secure access to, credentials storage, and use of system 100's services. For example, an interface can be provided to a user to provide credentials for initial user set up. Essence hub 102 can manage a secure repository for storing user information. Essence hub 102 can provide a mechanism for comparing user-provided login credentials with stored credentials to authenticate and grant/deny access. Essence hub 102 can provide a mechanism for user to reset password.

Essence hub 102 can ensure scalability. Essence hub 102 can ensure that real-time services such as switching are executed at the point of need (e.g. on the actual switch) while near-real time services run on a system typically centrally located (e.g. master controller).

Essence hub 102 can provide a Broadcast Foundry centralized management and control system. Essence hub 102 can provide the components and methods required to manage the infrastructure and services that comprise a Broadcast Foundry. Essence hub 102 can enable the insertion of entities such as, inter alia: infrastructure management, storage management, policy management, billing, break/fix, etc.

Figure 3:
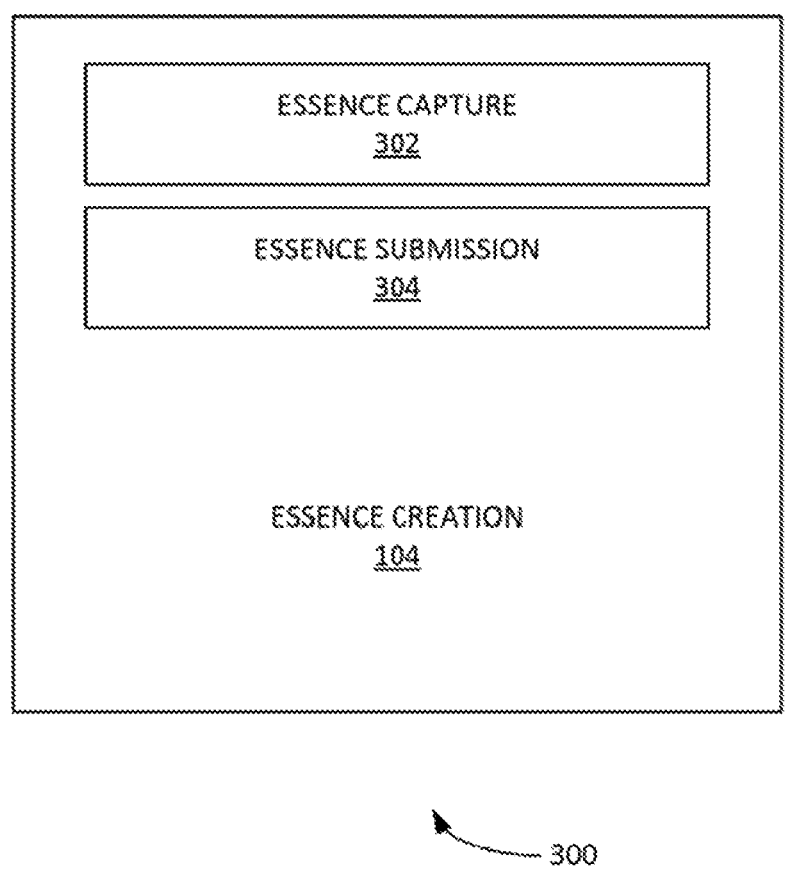
FIG. 3 illustrates an example essence creation module, according to some embodiments.

FIG. 3 illustrates an example essence creation module 104, according to some embodiments. Essence creation module 104 can include various components used for essences to be created and submitted to system 100. Example essence creation sources can include, inter alia: live remote and/or studio-based professional camera crew using Offsite Broadcast van (OBV); pre-recorded, post-production content from professionals, freelancers, amateurs, computer graphics, animation, etc. It is noted that an essence can be raw video, audio, text-based or post-production quality, as well as meta-data about said media. Essences can be in a digital format that can be rendered for storage in a database format, communication across a computer network (e.g. the Internet, a local Wi-Fi network, etc.) and/or storage in a computer memory.

Essence capture module 302 can implement the live production essence content including, inter alia: audio, video, metadata, computer generated animation, and text-based data. The essence content can be streamed and/or encoded various formats such as, inter alia: streaming: RTMP, RTSP, MMS (Windows), SD/HD SDI, HDMI, IP cameras, Web streams, DV/HDV cameras, various capture cards. For encoding, essence capture module 302 can implement various formats can be implemented such as, for example: Flash, QuickTime, and Windows Media. Pre-recorded/Post-production content can be provided using various formats such as, for example: QuickTime, Flash, Windows Media, Motion JPEG, MPEG, MP4, etc.

Essence submission module 304 can manage one or more network links to the other entities of system 100 (e.g. essence hub 102, other Broadcast Foundry, etc.). In some examples, essence submission module 304 can maintain a sufficient bandwidth for smooth, high-quality live video contribution and a sufficient bandwidth for uploading pre-recorded content.

Essence submission module 304 can manage contributor access. For example, essence submission module 304 can manage various user authentication protocols such as ensuring that a contributor provides appropriate access credentials (e.g. using industry-standard access protocols such as: username and password). Essence submission module 304 can manage an interface for entering credentials (e.g. with a web server and/or various web security functionalities). Essence submission module 304 can provide a mechanism for authenticating user-entered credentials. Essence submission module 304 can manage one or more mechanisms for connecting multiple essence streams to essence hub 102. Essence submission module 304 can provide electronic receipts (e.g. via electronic mail and/or other electronic messaging systems such as text messages) when various essence content is received by entities of system 100 (e.g. from essence capture or essence creation activities).

Figure 4:
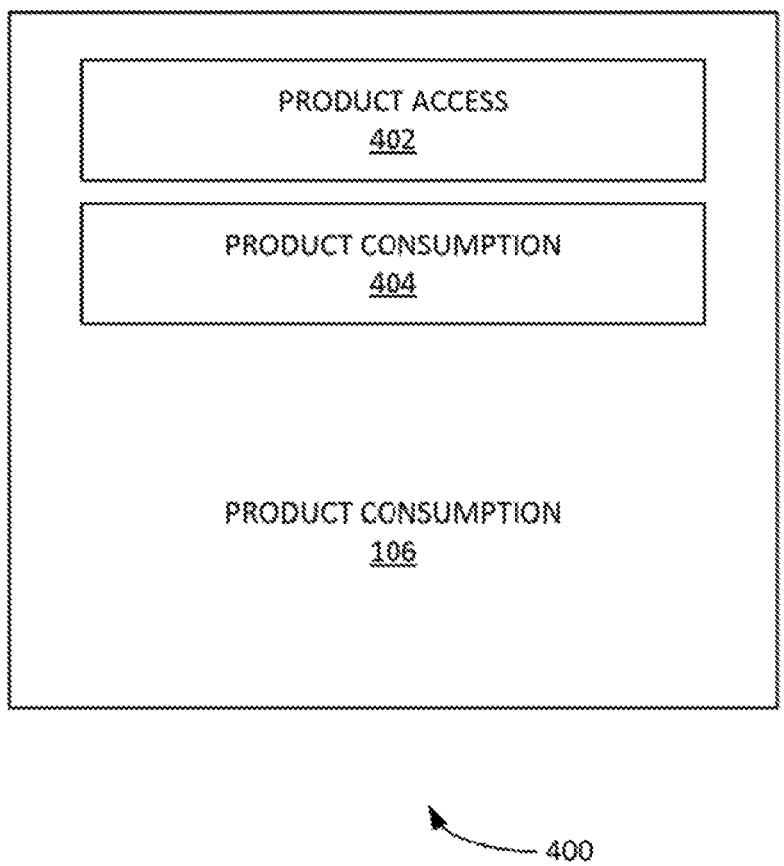
FIG. 4 illustrates an example product consumption module, according to some embodiments.

FIG. 4 illustrates an example product consumption module 106, according to some embodiments. Product consumption module 106 can manage various product access and consumption aspects of system 100. Product consumption module 106 can provide the components used for accessing and viewing essence content. Product consumption module 106 can manage an interface implemented on a digital multimedia device (e.g. an internet-equipped television, a set-top box, a computer, a tablet, or other mobile device). The interface can enable a user to access essence content. An essence content viewer can connect to an appropriate essence-content source location (e.g. web page, IP address, URL, etc.).

In some embodiments, a product access module 402 can enable a viewer to access Broadcast Foundry using method from essence hub 102 access control module 202. For example, based on a user profile (e.g. personal user, semi-professional broadcaster, professional broadcaster), the product access module 402 can provide a user access. Product consumption module 404 can provide an interface to display content on digital multimedia device. A user can connect (e.g. subscribes) to an essence content source location (e.g. via web page (URL, an IP address, or via a Broadcast Founder application)).

Example Processes and Methods

Figure 5:
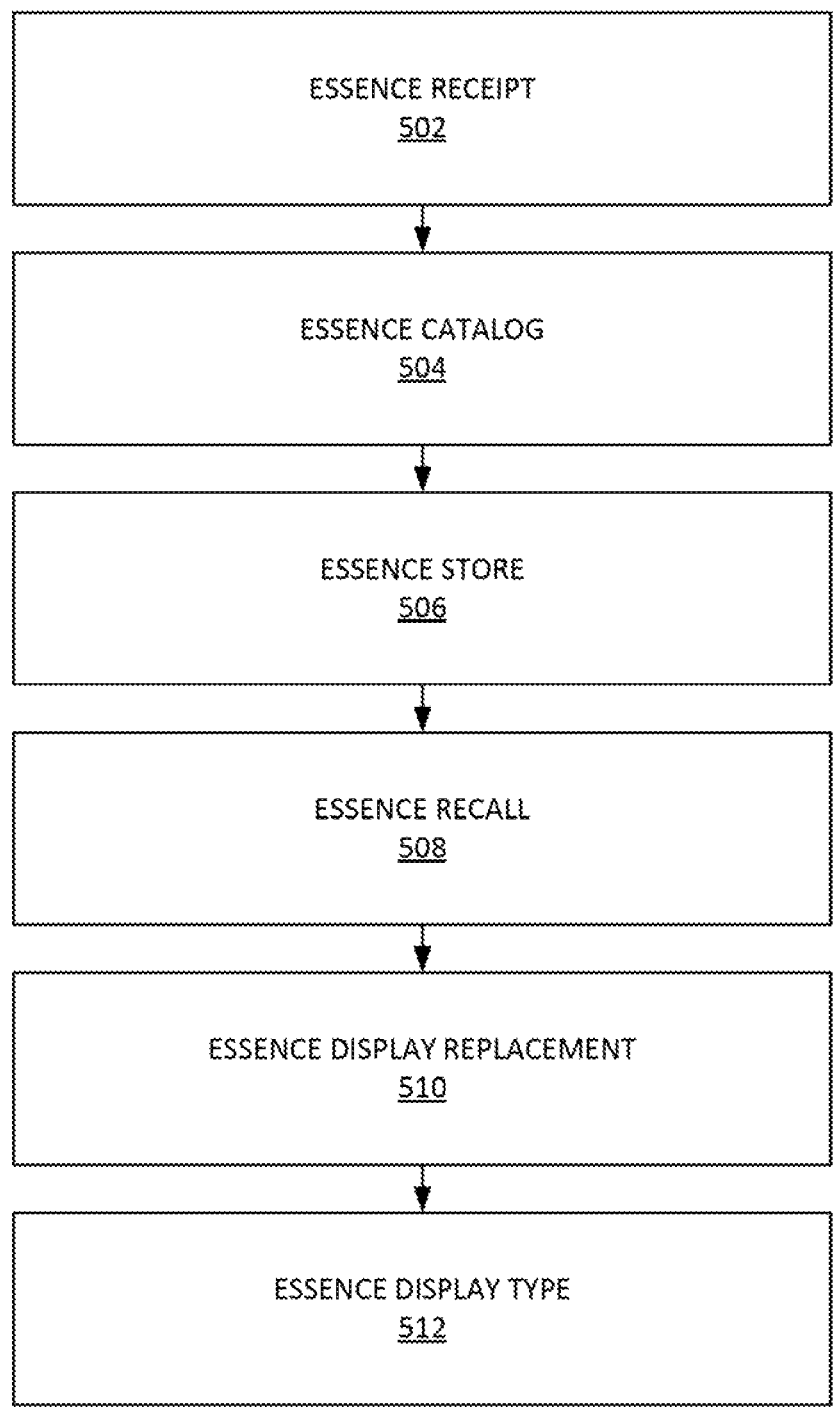
FIG. 5 illustrates an example process for essence mapping, according to some embodiments.

FIG. 5 illustrates an example process 500 for essence mapping, according to some embodiments. In step 502, process 500 can implement an essence receipt method. An essence receipt method can describe how essence data is received by a Broadcast Foundry. Each essence's source device will provide the metadata to describe the device and its payload of content and in some cases such as a video camera, the raw content itself. The following table shows examples of source devices their raw content and metadata. Every essence device's raw data is formatted by the source device into commonly known data formats. For example, a digital video camera may format the video signal into a standard format such as .MOV or .AVI or a proprietary format. Regardless of format, the Essence Mapper will receive the essence data and may maintain its format or re-format the data to meet operational objectives (e.g. compress for storage or archival purposes) as needed.

In step 504, process 500 can implement an essence catalog method. An essence catalog method can describe how essence data is cataloged and organized by the Broadcast Foundry. A method for organizing all essence data and metadata for future reference and recall. The Essence Catalog uses unique identifiers (IDs) generated by the source device and by broadcast or network staff to associate essence metadata and content with source devices, captured events, dates, or other criteria for future recall ability. For example, a Director may wish to see video and audio streams from all cameras in use at an event that occurred two months earlier, or feeds from only those cameras mounted on a mobile platform from three (3) minutes ago, or even feeds from cameras operated by fans attending the event. By cataloging the essence's data and metadata, essence content is available for quick recall.

In step 506, process 500 can implement an essence store method. An essence store method can describe how essence data is stored by the Broadcast Foundry. This method stores all essence data for future recall. Essences are stored using a combination of a database (for storing and querying for essence metadata) and traditional file storage (for large format data such as videos and audio) on any commonly used storage device.

In step 508, process 500 can implement an essence recall method. An essence recall method can describe how essence data is searched for and recalled for use by the Director.

Optionally, in step 510, process 500 can implement an essence-display placement method. An essence display placement method can be used by a Director to state where the essence information will be displayed in relation to the viewer's screen (e.g. upper left, upper right).

Optionally, in step 512, process 500 can essence-display type method. An essence-display type method can be used by Director to show how essence information will be displayed on viewer's screen (e.g. ticker type, table format, list format, etc.).

FIG. 6 illustrates an example table 600 illustrating various example source devices, associated raw content and/or metadata, according to some embodiments. In the case of a video camera as a source device, the raw content is a captured video signal. The metadata is a camera IP address, manufacturer, model, Global Positioning System (GPS) location, date, time, camera id, camera settings, operator id, essence type (e.g. video), platform type (e.g. mobile, static), etc. In the case of microphone as a source device, the raw content is a captured audio signal. The associated metadata is a microphone IP address, manufacturer, model, GPS location, date, time, mic id, mic settings, operator id, platform type (e.g. mobile, static), essence type, (e.g. audio), etc. In the case of a wearable device as a source device, the captured data (e.g. steps, hits, heart rate, body temp, GPS location, etc.), device IP address, manufacturer, model, date, time, device id, device settings, wearer id, essence type (e.g. bio metric), etc. In the case of a network switch as a source there may not be raw content. However, the metadata can include device IP address, manufacture, model, date, time, OS version, port usage, flow id usage, route id usage, etc. In the case of an audience device (e.g. mobile phone), the raw content can be the captured video and audio feeds from said device. The metadata can be the device type, manufacturer, model, date time, OS version, operator identifier (e.g. fan), etc. In the case of a drone platform, there may not be a raw content. The metadata can be device manufacturer, model, date, time, etc.

Figure 7B:
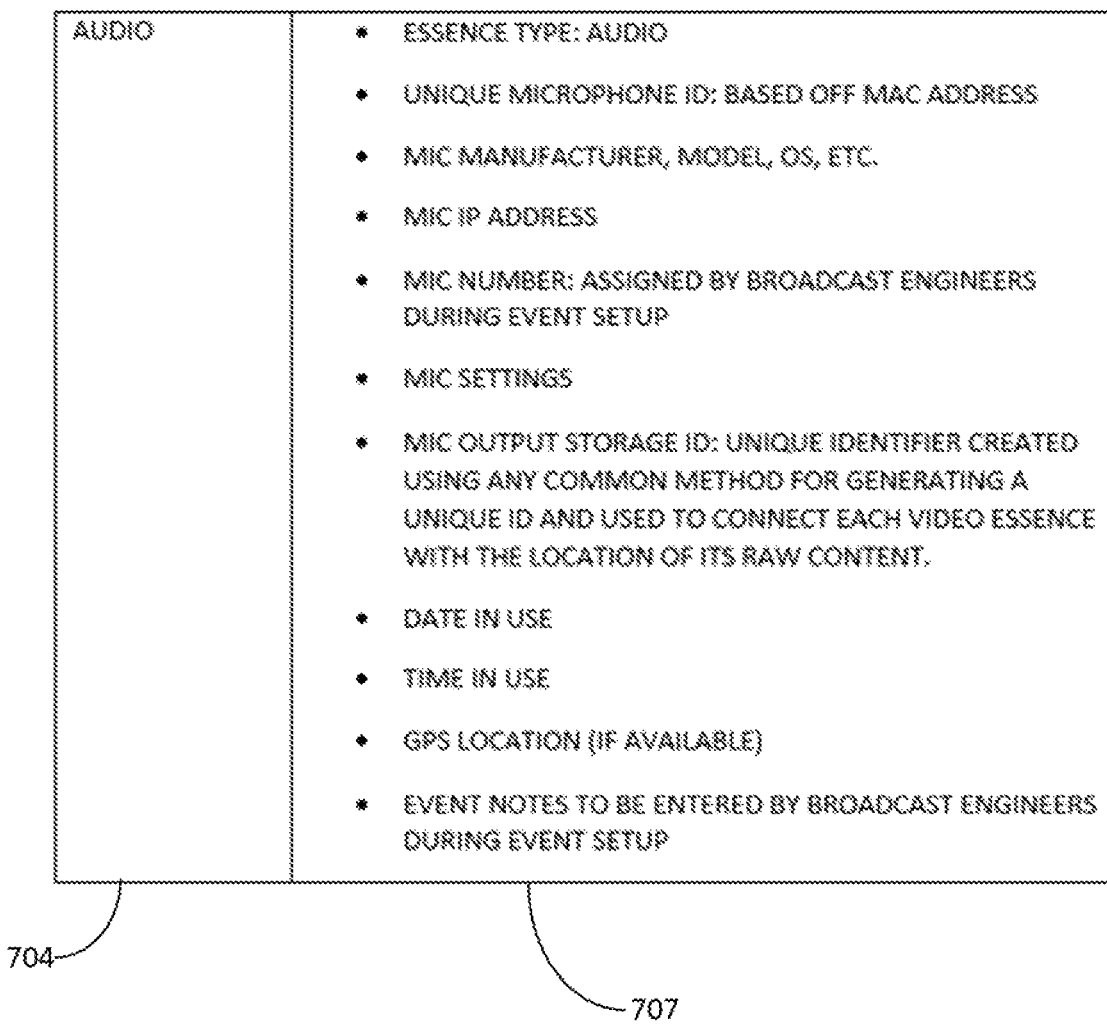
FIG. 7 A-G illustrate an example table mapping essence metadata for cataloging by essence source, according to some embodiments.
Figure 7C:
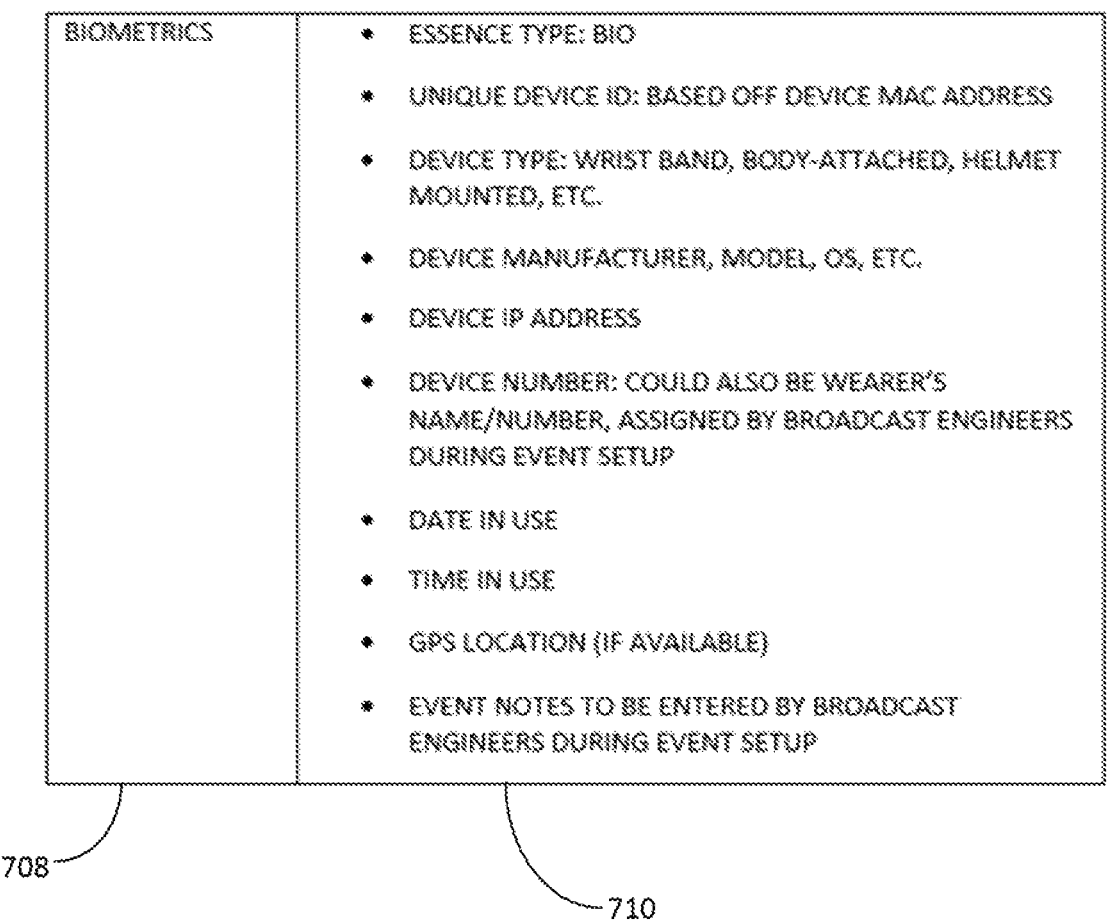
Figure 7G:
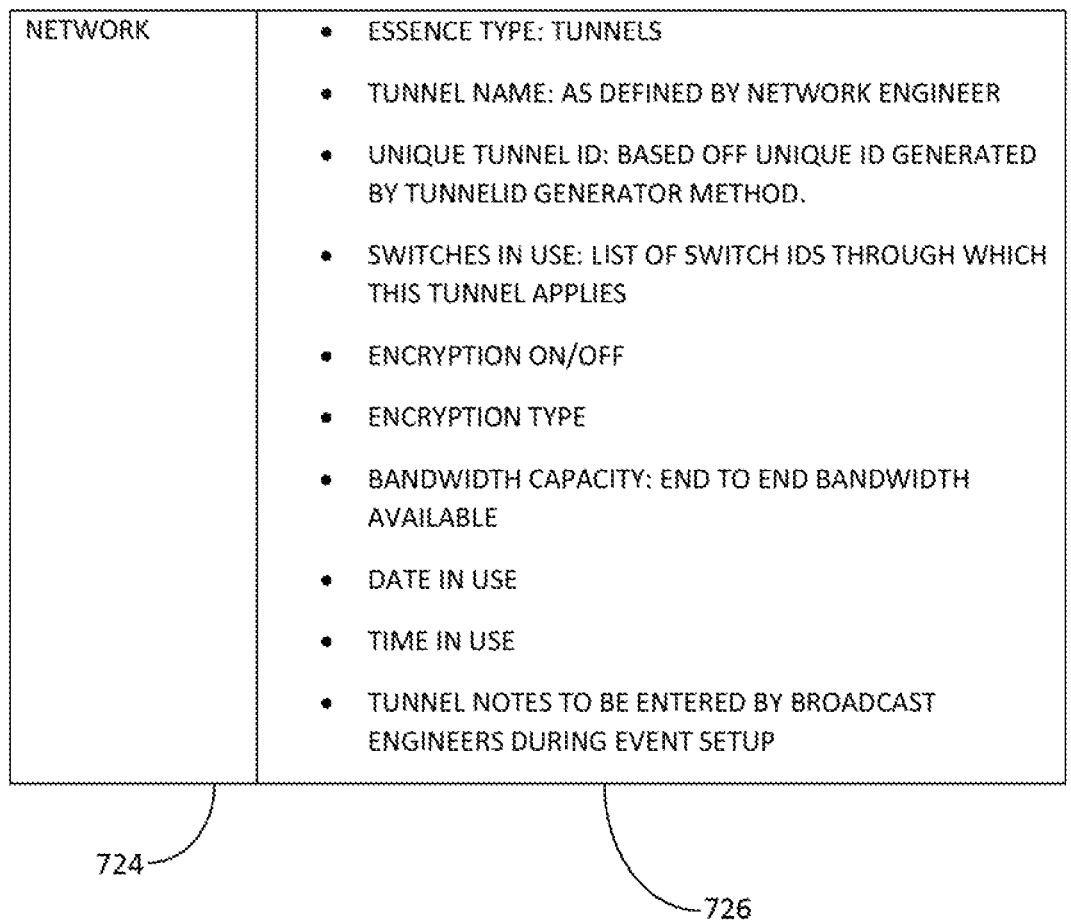

FIGS. 7 A-G illustrate an example table mapping essence metadata for cataloging by essence source, according to some embodiments. Essence sources can include, inter alia, video sources, audio sources, biometric sources, network sources, etc. The catalogue information column includes information about the relevant associated essence type and essence metadata.

As essences are captured, three additional processes can be implemented. These include processes 800-1100. Processes 800-1100 can be sub-processes of essence storage.

Figure 8:
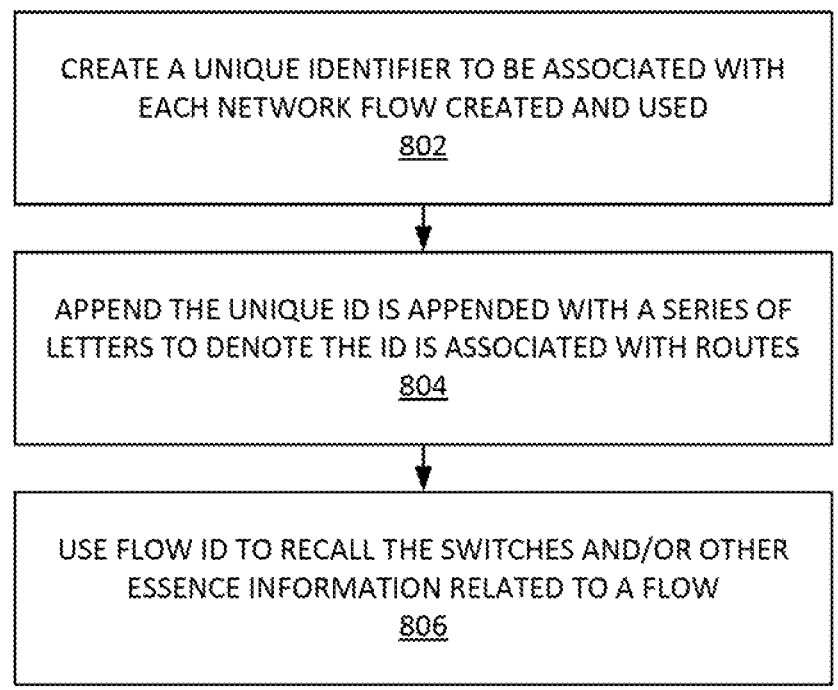
FIG. 8 illustrates an example process for a FlowID Generator, according to some embodiments.

FIG. 8 illustrates an example process 800 for a FlowID Generator, according to some embodiments. A Flow is a term used by the Broadcast Foundry for use by broadcast engineers seeking to view and manipulate the quality of a broadcast signal as it's transmitted from source to final destination. In step 802, process 800 creates a unique identifier to be associated with each network flow created and used. In step 804, process 800 appends the unique ID is appended with a series of letters (e.g. FLO) to denote the ID is associated with routes. In step 806, process 800 uses the FlowID to recall the switches and/or other essence information related to a Flow.

Figure 9:
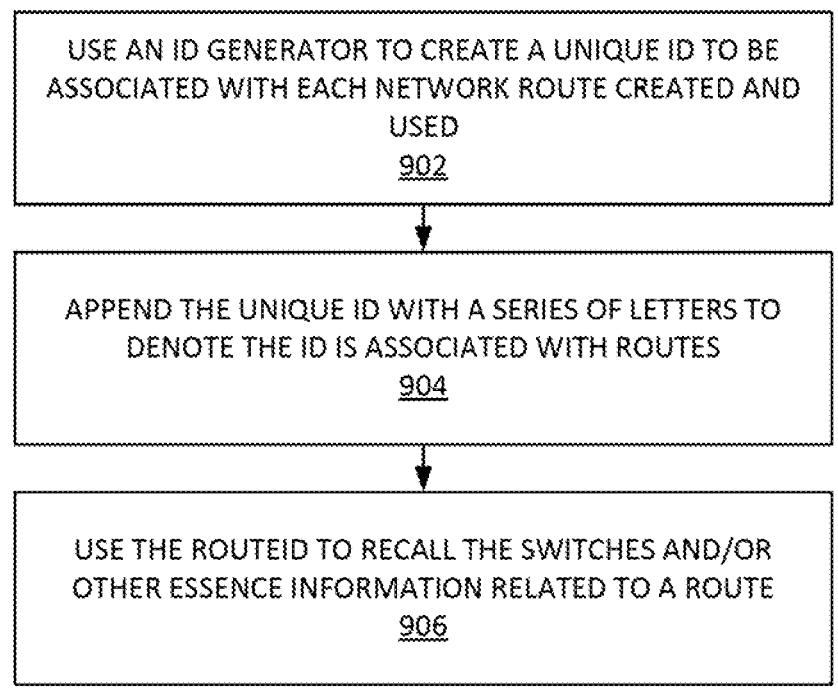
FIG. 9 illustrates an example process for a RouteID Generator, according to some embodiments.

FIG. 9 illustrates an example process 900 for a RouteID Generator, according to some embodiments. A Route can be a term used by the Broadcast Foundry for use by network engineers seeking to view and manipulate the physical routes of a broadcast signal as it's transmitted from source to final destination. In step 902 process 900 uses an ID generator to create a unique ID to be associated with each network route created and used. In step 904, process 900 appends the unique ID with a series of letters (e.g. RTE) to denote the ID is associated with routes. In step 906, process 600 can use the RouteID to recall the switches and/or other essence information related to a Route.

Figure 10:
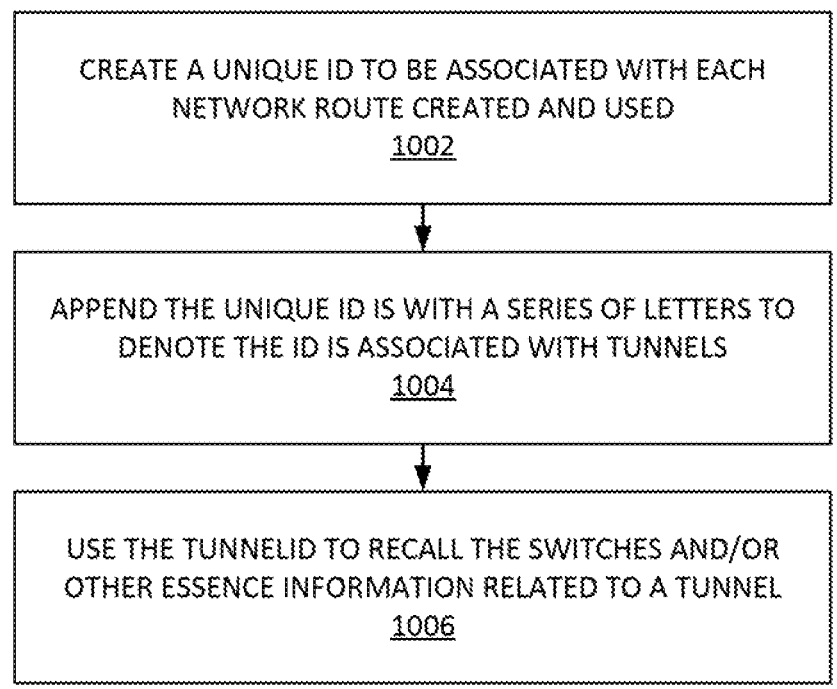
FIG. 10 illustrates an example process for a TunnelID Generator, according to some embodiments.

FIG. 10 illustrates an example process 1000 for a TunnelID Generator, according to some embodiments. A Tunnel is a term used by the Broadcast Foundry for use by network engineers seeking to view and manipulate the physical-to-virtual routes mapping of an encapsulated broadcast signal as it's transmitted from source to final destination. In step 1002, process 1000 can create a unique ID to be associated with each network route. In step 1004, process 100 can append the unique ID is with a series of letters (e.g. TNL) to denote the ID is associated with tunnels. In step 1006, process 1000 can use the TunnelID to recall the switches and/or other essence information related to a Tunnel.

Figure 11:
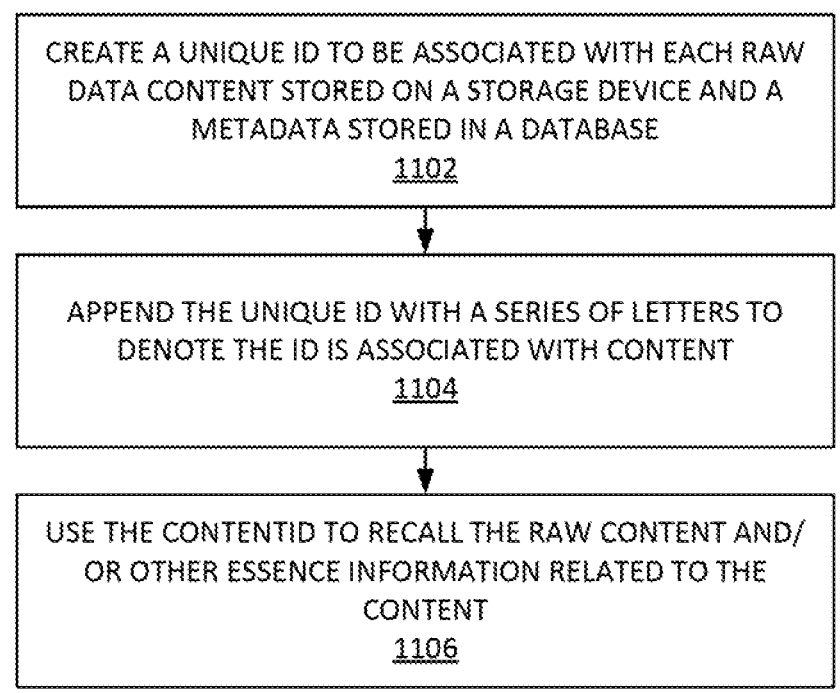
FIG. 11 illustrates an example process for a ContentID Generator, according to some embodiments.

FIG. 11 illustrates an example process 1100 for a ContentID Generator, according to some embodiments. Process 1100 can create a unique ID to be associated with each raw data content stored on a storage device and a metadata stored in a database in step 1102. In step 1104, process 1100 can append the unique ID with a series of letters (e.g. CON) to denote the ID is associated with content. Additionally, the unique ID is used as a directory name for content stored outside the database. In step 1106, process 1100 can use the ContentID to recall the raw content and/or other essence information related to the content.

It is noted that Essence Recall can be used to quickly locate and recall essence information. Essences can be searched for and recalled using a query method whereby the user (e.g. a Director, show producer, or other user) can specify criteria using an interface that allows for selection criteria to be specified and submitted for execution. The results of the query can then be presented with essences that meet that criteria. The user is then able to select an element from the result set for playback to the viewer, to the Director, or both. The method with which the playback is displayed, also known as Essence Display Type (e.g. full screen, picture-in-picture, ticker tape data on bottom of screen, etc.) and Essence Display Placement can be determined at time of playback but is not part of this method.

Additional Exemplary Computer Architecture and Systems

Figure 12:
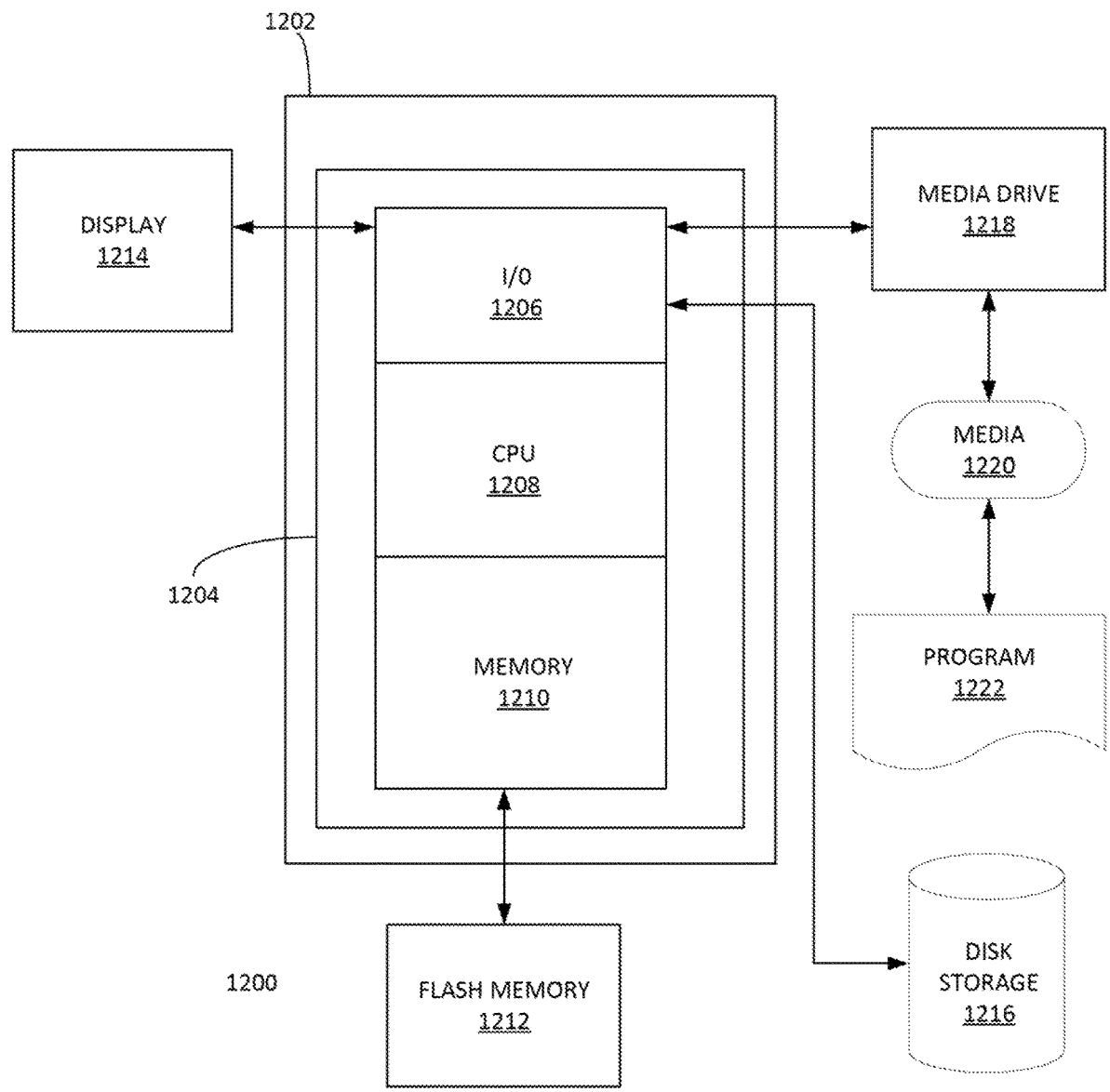
FIG. 12 depicts an exemplary computing system that can be configured to perform any one of the processes provided herein.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 13:
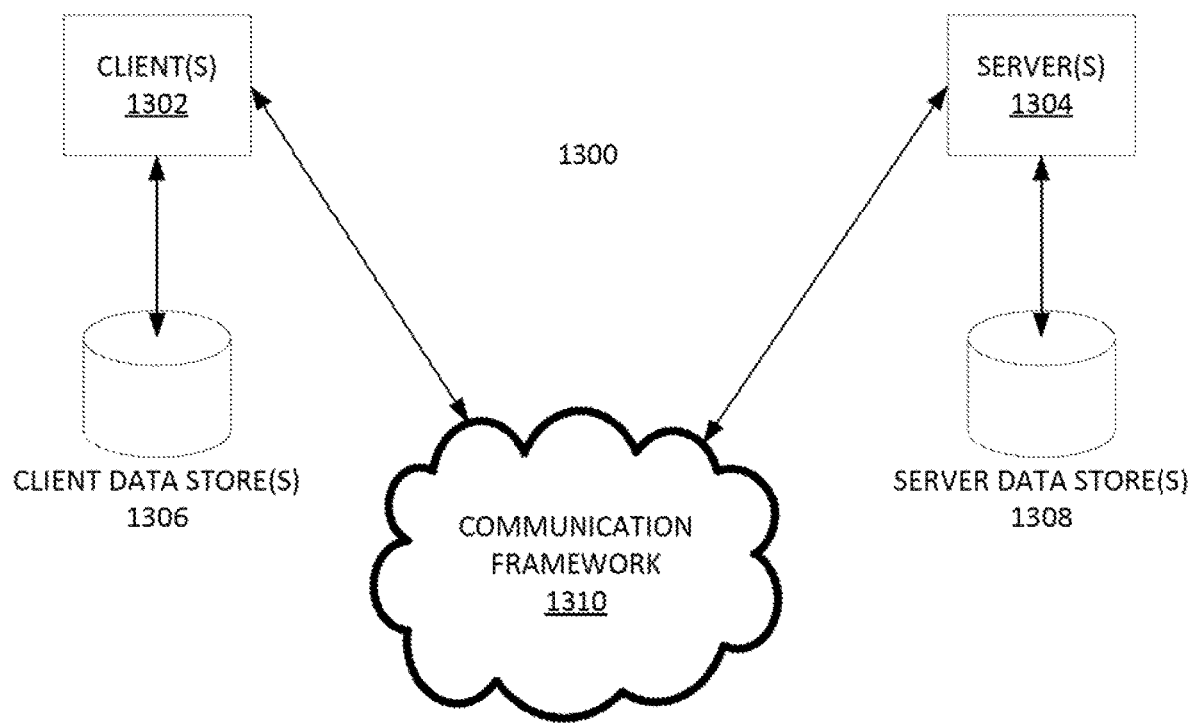
FIG. 13 is a block diagram of a sample computing environment that can be utilized to implement various embodiments.

FIG. 13 is a block diagram of a sample computing environment 1300 that can be utilized to implement various embodiments. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). One possible communication between a client 1302 and a server 1304 may be in the form of a data packet adapted to be transmitted between two or more computer processes. The system 1300 includes a communication framework 1310 that can be employed to facilitate communications between the client(s) 1302 and the server(s) 1304. The client(s) 1302 are connected to one or more client data store(s) 1306 that can be employed to store information local to the client(s) 1302. Similarly, the server(s) 1304 are connected to one or more server data store(s) 1308 that can be employed to store information local to the server(s) 1304. In some embodiments, system 1300 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method comprising:
receiving an essence from a source device, wherein the essence comprises one or more elements of media content used in a live-production broadcast environment, and wherein the essence is used by a broadcast director to apply artistic intent for distribution to viewers of a broadcast;
creating an essence catalog, wherein the essence catalog uses unique identifiers generated by the source device to associate an essence metadata and an essence content with a source device, a captured event and a date for future recall ability;
implementing an essence store, wherein the essence store describes how an essence is stored in a data store;
storing the essence in the essence store;
implementing an essence recall that describes how an essence is to be searched for and recalled for use by a director of the broadcast;
implementing an essence search based on the essence recall;
obtaining the stored essence;
creating a unique flow identifier associated with a network flow associated with an essence;
appending the unique flow identifier with a series of letters and is associated with a route of the network flow;
uses the unique flow identifier to recall a set of switches and other essence information;
creating a unique route identifier associated with each network route, where a switch comprises a network switch that connects devices together on a computer network by using packet switching to receive, process and forward data to a destination device; and
using the unique route identifier to recall the switch and other essence information related to a route.

2. The method of claim 1 further comprising:
implementing an essence-display placement that instructions a broadcast system where to display the essence information in relation to a viewer's screen.

3. The method of claim 2 further comprising:
specifying an essence-display type method that instructs how an essence information is to be displayed on viewer's screen.

4. The method of claim 3, wherein the essence-display type comprises a ticker type, a table format and a list format.

5. The method of claim 4 wherein the source device comprises a digital camera of a mobile device used by an audience member to film a sporting event.

6. The method of claim 4 wherein the source device comprises a digital microphone.

7. The method of claim 4 wherein in the source device comprises a virtual camera attached to a player in the sporting event.

8. A server system for implementing a real-estate computing platform comprising:
a processor configured to execute instructions;
a memory containing instructions when executed on the processor, causes the processor to perform operations that:
receive an essence from a source device, wherein the essence comprises one or more elements of media content used in a live-production broadcast environment, and wherein the essence is used by a broadcast director to apply artistic intent for distribution to viewers of a broadcast;
create an essence catalog, wherein the essence catalog uses unique identifiers generated by the source device to associate an essence metadata and an essence content with a source device, a captured event, a date for future recall ability;
implement an essence store, wherein the essence store describes how an essence is stored in a data store;
store the essence in the essence store;
implement an essence recall that describes how an essence is to be searched for and recalled for use by a director of the broadcast;
implement an essence search based on the essence recall;
obtain the stored essence;
creating a unique flow identifier associated with a network flow associated with an essence;
appending the unique flow identifier with a series of letters and is associated with a route of the network flow;
using the unique flow identifier to recall a set of switches and other essence information;
creating a unique route identifier associated with each network route, where a switch comprises a network switch that connects devices together on a computer network by using packet switching to receive, process and forward data to a destination device; and
using the unique route identifier to recall the switch and other essence information related to a route.

* * * * *